Jan. 6, 1948. J. B. DYER 2,434,199
CONTROL FOR AUTOMATIC CLOTHES WASHING MACHINE
Original Filed Aug. 30, 1938 8 Sheets-Sheet 3

INVENTOR.
BY John B Dyer
Spencer Hardman and Fehr
attorneys

Jan. 6, 1948.   J. B. DYER   2,434,199
CONTROL FOR AUTOMATIC CLOTHES WASHING MACHINE
Original Filed Aug. 30, 1938   8 Sheets-Sheet 5

INVENTOR.
BY John B. Dyer
Spencer Hardman and Fehr
Attorneys

Jan. 6, 1948.  J. B. DYER  2,434,199
CONTROL FOR AUTOMATIC CLOTHES WASHING MACHINE
Original Filed Aug. 30, 1938  8 Sheets-Sheet 6
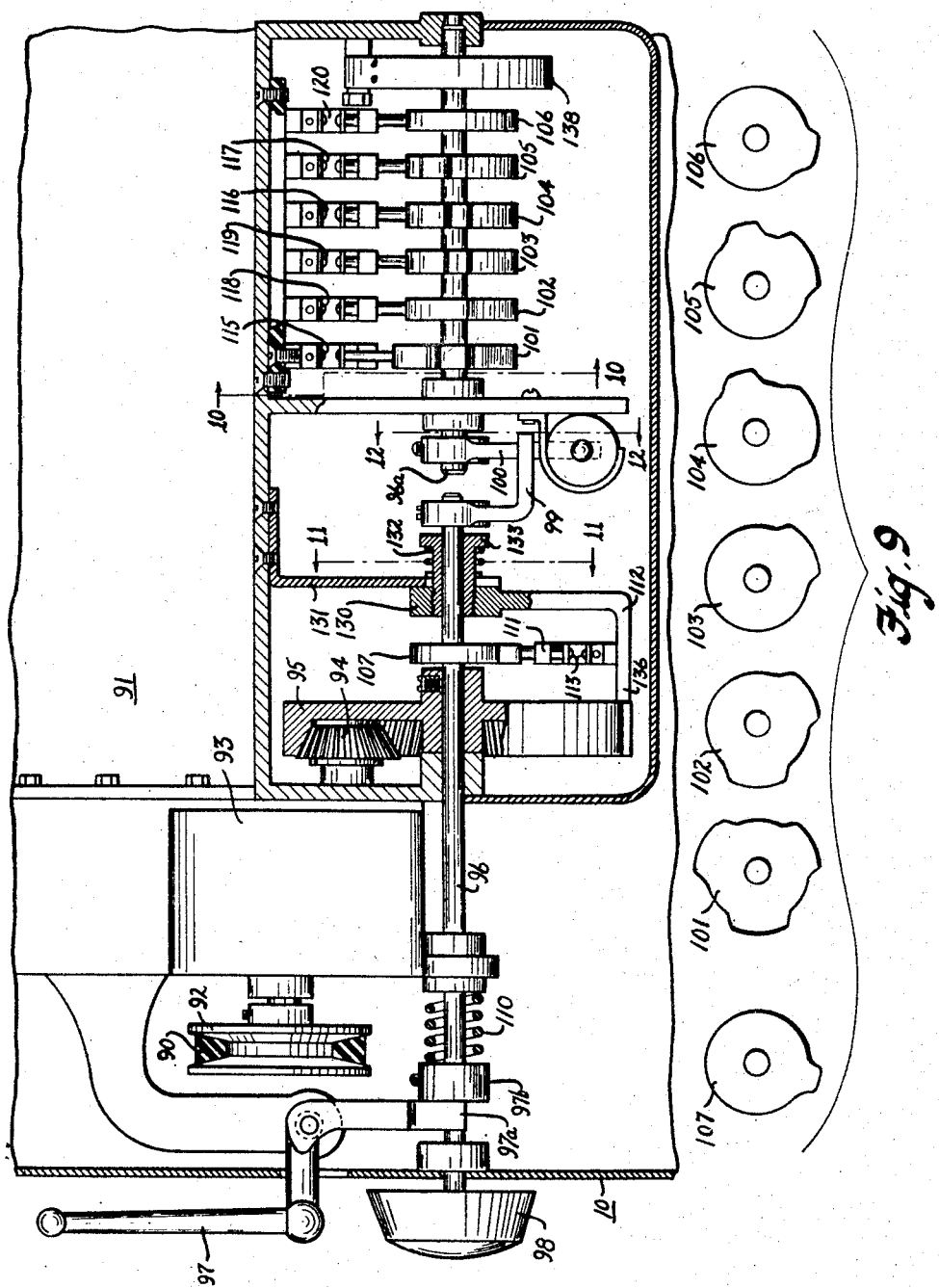

Jan. 6, 1948.  J. B. DYER  2,434,199
CONTROL FOR AUTOMATIC CLOTHES WASHING MACHINE
Original Filed Aug. 30, 1938   8 Sheets-Sheet 8

INVENTOR.
BY John B Dyer
Spencer Hardman and Fehr
Attorneys

Patented Jan. 6, 1948

2,434,199

UNITED STATES PATENT OFFICE 2,434,199

CONTROL FOR AUTOMATIC CLOTHES WASHING MACHINE

John B. Dyer, Syracuse, N. Y., assignor to General Motors Corporation, Dayton, Ohio, a corporation of Delaware Original application August 30, 1938, Serial No. 227,519, now Patent No. 2,325,837, dated August 3, 1943. Divided and this application January 20, 1943, Serial No. 472,933

4 Claims. (Cl. 68—12)

This application is a division of my application Serial No. 227,519 filed August 30, 1938 now Patent No. 2,325,837 issued Aug. 3, 1943 and is particularly directed to the automatic washing machine disclosed therein wherein the tub is automatically filled prior to the variable washing period, the duration of which may be selected prior to the initial filling. The washing period is followed by the automatically controlled rinsing and drying operations.

This invention relates to a domestic appliance.

An object of this invention is to provide a washing machine capable of performing a washing operation and a drying operation in the same tub.

Another object of this invention is to provide a washing machine in which washing, drying and rinsing operations can be automatically performed in the same vertically disposed tub.

More specifically it is an object of this invention to provide a washing machine in which clothes may be placed in the tub, proper washing fluids may be placed in the reservoirs provided therefor, the automatic controls may be set for the desired operations, and the machine may be started. Thereafter the selected operations are performed automatically without further attention from the user.

Further objects and advantages of the present invention will be apparent from the following description, reference being had to the accompanying drawings, wherein a preferred form of the present invention is clearly shown.

In the drawings:

Fig. 8 is a cross-section of the automatic controlling mechanism;

Fig. 9 is a diagrammatic representation of the various cams used in the controlling mechanism;

Fig. 17 is a time sheet indicating how the various cams control the various operations of the washing machine.

Figure 1:
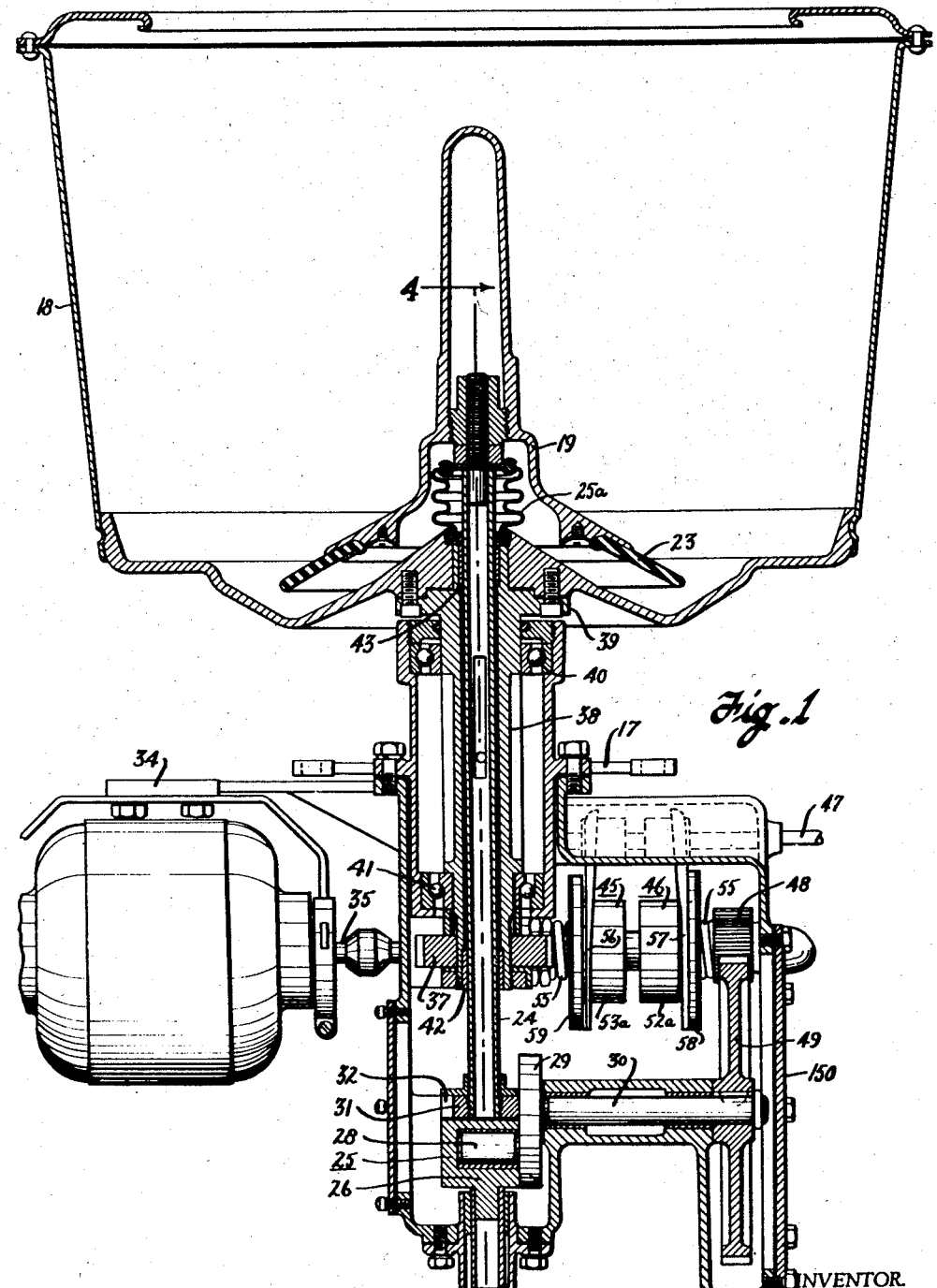
Fig. 1 is a vertical cross-section of the tub and driving parts of a washing machine embodying my invention.
Figure 2:
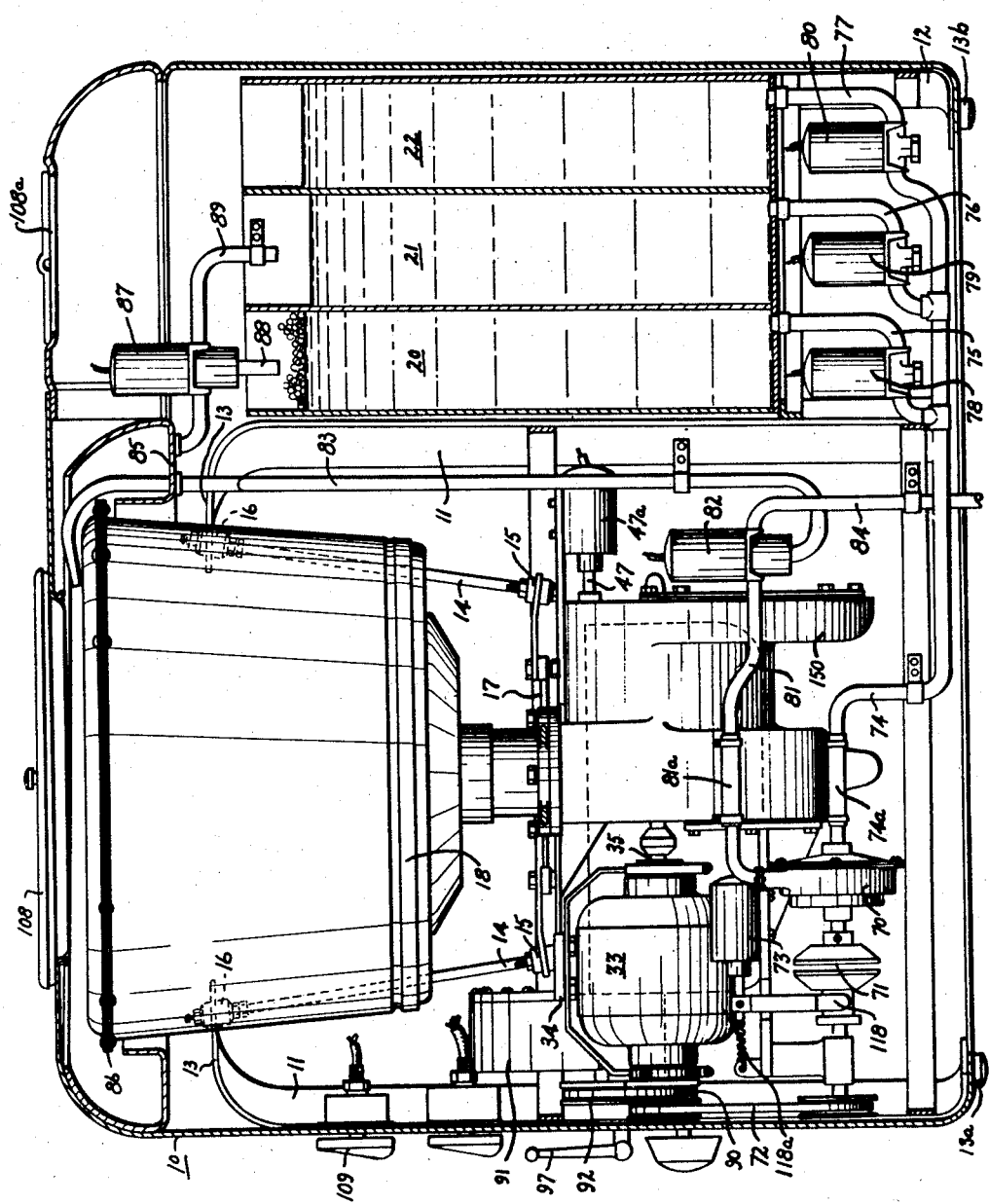
Fig. 2 is a cross-section of my washing machine, showing the outer casing and several other parts in cross-section.
Figure 3:
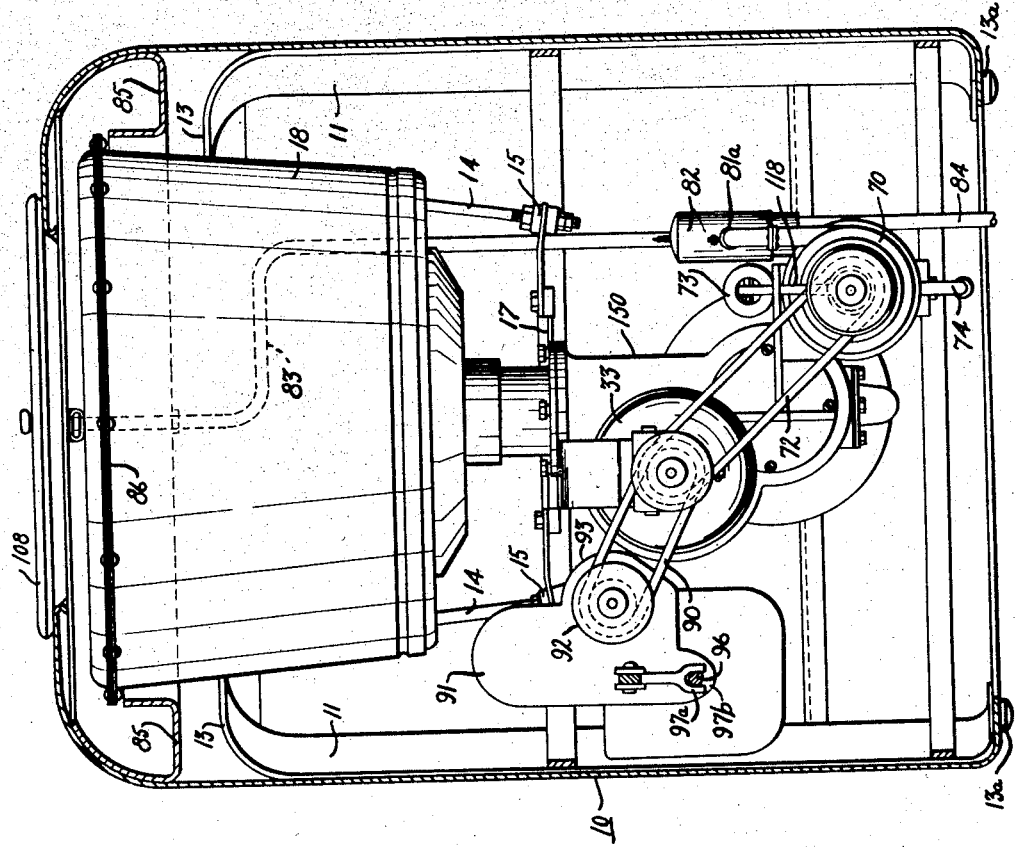
Fig. 3 is a cross-section transverse to Fig. 2.

The clothes, or other articles to be washed, may be placed in the tub of my washing machine. A soap solution may be placed in one reservoir and first and second rinse waters may be placed in their respective reservoirs. The automatic controls may then be set for a selected length of wash period and the machine started. Thereafter the washing machine automatically pumps the soap solution into the tub; agitates the clothes for the selected length of time in the soap solution; centrifuges the soap solution out of the clothes and back to its reservoir for subsequent use; pumps the first rinse water into the tub; agitates the clothes in the first rinse water for the proper length of time; centrifuges the first rinse water into a sewer connection; pumps the second rinse water into the tub; agitates the clothes in the second rinse water for the proper length of time; centrifuges the second rinse water into the first rinse water reservoir for use, as first rinse water, with a subsequent "batch" of clothes; and then stops the motor of the machine in readiness for further washings or for proper cleansing of the machine at the completion of the washing operations.

My washing machine preferably is enclosed in a streamlined casing 10 adapted to be supported on the floor. The casing preferably contains the moving parts of the washing machine, reservoirs in which to store the various washing fluids, and the automatic controls which cause the washing machine to perform, in proper sequence, the various washing operations necessary to wash, and rinse the clothes and extract excess fluids therefrom.

The casing 10 is provided with, or supported on, a plurality of vertical supporting standards 11 and 12. These standards support the moving parts of the washing machine. To this end, standards 11 are arched at 13, to provide supports for the rods 14. Some of the standards 11 are provided with pedestals or casters 13a to rest on the floor. The machine may be provided with other pedestals or casters 13b, as desired. The rods 14 are provided with rubber or rubber-like, end members 15 and 16 to insulate them both from a noise and a vibration standpoint. These rods are supported at their upper ends by the arched portions 13 of the rods 11 and support, at their lower ends, a frame 17 upon which the tub 18, and the driving parts therefor are supported. The rods 14 and frame 17 therefore provide a free swinging support for the tub and the driving parts therefor, so that the force of the vibrations of the tub is greatly reduced, and is practically dampened before it is transmitted to the floor upon which the washing machine rests.

The swinging parts of the washing machine are joined to the relatively stationary parts of the washing machine by flexible hose connections, and, where control knobs, etc., are supported on the swinging parts of the washing machine and pass through the casing 10, suitable openings are provided to allow such control rods to vibrate with the swinging parts, without touching the casing 10.

The tub 18 preferably is mounted for spinning or rotation about a vertical axis to perform the extracting or centrifuging action. A vertically pulsating, cone-shaped agitator 19 is placed within the tub. The arrangement is such that articles to be washed can be placed in the tub 18, a proper washing solution, and first and second rinse waters can be placed in the reservoirs 20, 21 and 22. Thereafter, by proper setting of the control mechanism, the clothes are automatically washed in the washing solution, centrifuged, rinsed, centrifuged, rinsed, and again centrifuged to provide the complete washing of the clothes, in situ. The articles to be washed are agitated in the various washing fluids, which form bodies of washing fluid in the tub 18, by a series of strong, pulsating, radially outwardly directed currents of the fluid at the bottom of the body of fluid in the tub 18. Thereafter the washing fluid is removed from the articles to be washed by imparting, in situ, a whirling centrifugal action to the tub 18. The various mechanisms with which these steps are carried out are illustrated in the drawings.

The cone-shaped agitator 19 is preferably provided with a cone-shaped rubber, or rubber-like, rim 23 along its lower edge. The agitator is supported on the upper end of a vertically reciprocable rod 24. A suitable metallic or rubber-like diaphragm 25a is provided near the rod 24 or agitator 19 of the tub 18 to prevent the flow of liquid along the rod 24. The rod 24 is vertically reciprocated by means of a Scotch yoke mechanism 25 at its lower end. The Scotch yoke mechanism is of such a character that it imparts a vertical reciprocating movement to the rod 24 and permits the same to rotate with the tub 18 when the tub is rotated.

The agitator 19 preferably is given a vertical reciprocating movement of about 1½ inches to 2 inches, at a speed of about 450 pulsations per minute. Preferably the tub 18 is about 20 to 25 inches in diameter at the top. When clothes are placed in the tub, with liquid nearly to the top, and the agitator is reciprocated at the rate above given, a very efficient washing action is obtained. The agitator tends to impart a "smoker's ring" or torroidal movement to the clothes and water, and this flexes the clothes continuously during the washing operation and frees the dirt from them. The ring 23 tends to impart a rubbing action to the clothes and acts as a "duck's foot" in imparting strong pulsating, radially outwardly directed water currents at the bottom of the tub, which, in turn, impart the "smoker's ring" agitation to the main body of water.

The Scotch yoke mechanism 25 includes the portion 26 provided with a horizontal slot 27 which is engaged by the pin 28 eccentrically carried on the disc 29. The disc 29 is rotated by the shaft 30. The rod 24 is secured to a ring 31 which is rotationally free in the slot 32, so that when the portion 26 is reciprocated, the ring 32 and rod 24 are also reciprocated. On the other hand, when the tub is rotated, the agitator 19, rod 24 and ring 31 can rotate independently of the portion 26.

The tub and driving mechanism are mounted on the swinging frame 17. The driving mechanism includes a motor 33 suspended from the bracket 34. The motor 33 has a driving connection to impart rotation to the tub 18. To this end, the motor 33 drives a shaft 35, provided with a worm 36 engaging the gear wheel 37. The gear wheel 37 is keyed to a hollow shaft 38, which carries, at its upper end a platform 39, bolted to the bottom of the tub 18. The shaft 38 is provided with ball bearings 40 and 41, the ball bearing 41 preferably being a thrust bearing, to receive the weight of the tub. The reciprocable shaft 24 is loosely mounted within the shaft 38 and preferably is provided with sleeve bearings 42 and 43.

The motor driven shaft 35 is provided with clutch means 44 for selectively connecting the tub centrifugal drive, or an agitator reciprocating drive with the motor 33. The clutch means includes the centrifugal clutch 45 and the reciprocating clutch 46. These clutches are actuated by a reciprocable rod 47 in such a manner that when the rod 47 is moved to the right, Figs. 1 and 5, the centrifugal clutch 45 is engaged, and when the rod 47 is moved to the left the reciprocating clutch 46 is engaged. When the clutch 45 is engaged, the worm 36 is rotated, thus causing centrifugal rotation of the tub. When the clutch 46 is engaged, the gear 48 is rotated, which in turn drives the large gear wheel 49 carried by the shaft 30. Rotation of the shaft 30 causes reciprocation of the agitator 19 through the medium of the shaft 24.

Figure 5:
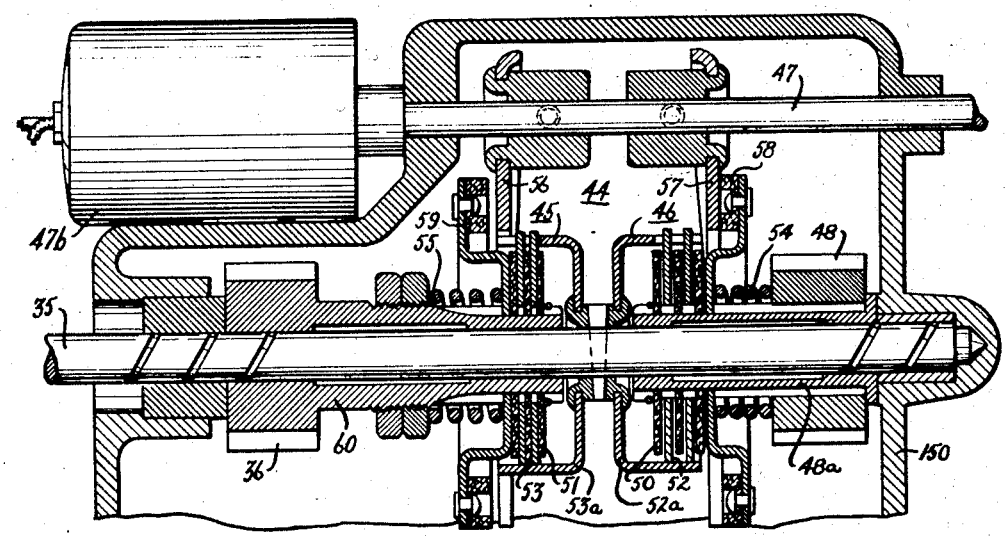
Fig. 5 is a vertical cross-section showing the clutch mechanism.
Figure 4:
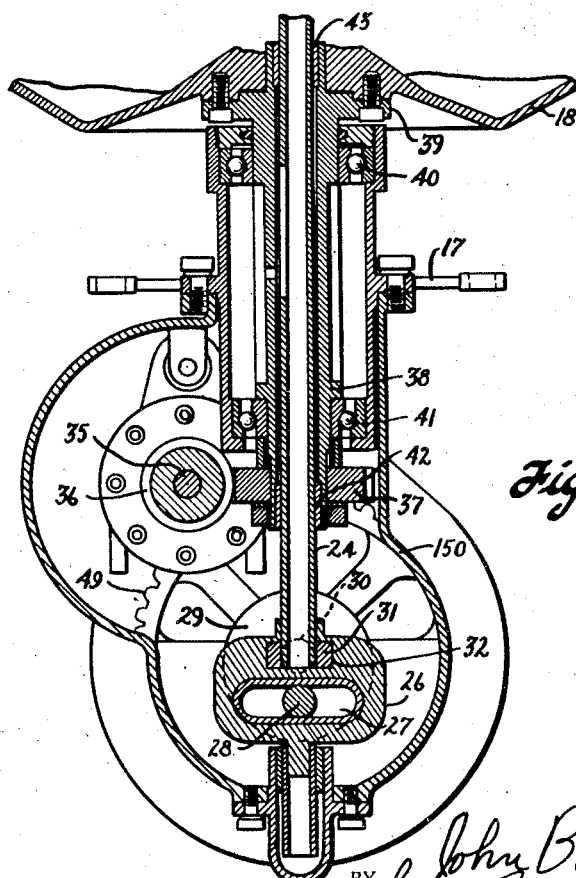
Fig. 4 is a vertical cross-section taken along the line 4—4 of Fig. 1.
Figure 10:
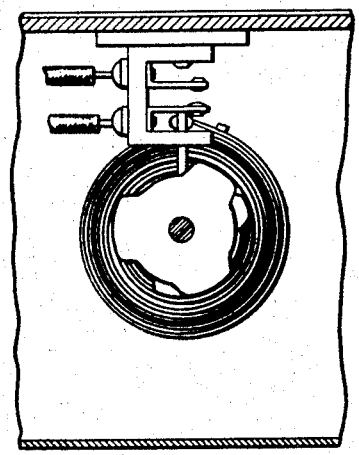
Fig. 10 is a cross-section taken along the line 10—10 of Fig. 8.
Figure 7:
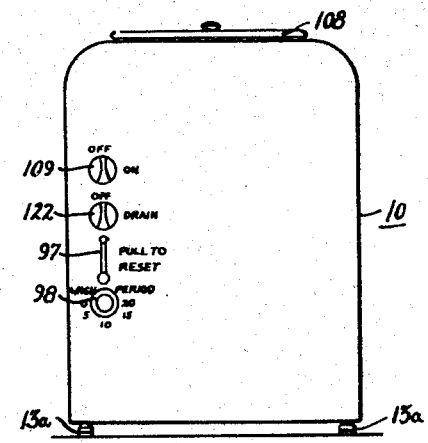
Fig. 7 is an end elevation of the washing machine.

Any suitable type of selective clutch mechanism may be used. For example, the clutch mechanism shown in Fig. 5 includes driven discs 50 and 51 and driving discs 52 and 53 carried by the cups 52a and 53a, respectively, keyed to the shaft 35. Spring 54 urges the clutch discs 50 and 52 into engagement while spring 55 urges the clutch discs 51 and 53 into engagement. The rod 47 carries brake elements 56 and 57. When the rod is moved to the right, as shown in Fig. 5, the brake element 57 engages with the brake disc 58 and removes the spring pressure of spring 54 from the discs 50 and 52 thus disengaging the reciprocating drive and applying a braking action to it. At the same time, the brake element 56 is moved away from the brake disc 59. This permits the force of the spring 55 to be applied to the discs 51 and 53 thus bringing the sleeve 60, carrying the worm 36, into driving engagement with the shaft 35, thus causing centrifugal rotation of the tub. Conversely, when the shaft 47 is moved to the left, the discs 51 and 53 are disengaged, and the discs 50 and 52 are engaged, thus connecting the agitator 19 to the motor through the medium of shaft 35, discs 50 and 52, etc., the discs 50 being keyed on sleeve 48a carrying gear 48.

The shaft 47 is moved to the right by spin solenoid 47a and to the left by agitation solenoid 47b. These solenoids are automatically energized at the proper times by the control mechanism herein more fully described. When neither solenoid is energized, both the tub and the agitator remain stationary, since both clutches 45 and 46 are disengaged at "neutral" position of rod 47.

The washing machine may be provided with suitable reservoirs 20, 21 and 22, and suitable liquid flow connections may be provided for introducing liquids from the reservoirs 20, 21 and 22 into the tub 18, for returning such liquids from the tub into the proper reservoirs or for discharging the liquid from the tub into a suitable drain connection. For this purpose, a pump 70 is provided, which is drivingly engaged with the motor 33 through the medium of a clutch 71 and a belt drive 72, the clutch 71 being actuated by the solenoid 73. The intake of the pump 70 is connected, by a partly flexible pipe 74 with the reservoirs 20, 21 and 22 through the medium of branches 75, 76 and 77 respectively, which branches are provided with solenoid valves 78, 79 and 80 respectively. The discharge of the pump 70 is connected through the medium of a partly flexible pipe 81, solenoid valve 82 and pipe 83 with the tub 18, and is also connected with a drain connection 84, which branches from the solenoid valve 82. A drain trough 85 is placed around the upper portion of the tub 18, so that liquid can be discharged from the tub through the slotted opening 86 into the trough 85. From thence the liquid can be discharged into the reservoirs 20 or 21, as selected by the solenoid valve 87, through the medium of pipes 88 and 89. The pipes 74 and 81 are rendered partially flexible by rubber hose sections 74a and 81a.

The various operations of the washing machine may be automatically controlled. For this purpose, the motor 33 is drivingly connected, through belt 90, with a control switch box 91, which is provided with suitable cam actuated switches to perform the desired sequence of operations. The pulley 92, by proper gear reduction mechanism in gear box 93 drives the cone-shaped gear 94 at a reduced rate. The gear 94 is engageably and disengageably connected to the internal cone-shaped gear wheel 95 to drive the shaft 96 at slow speed. The shaft 96 is longitudinally movable by the handle 97, through the forked crank 97a and disc 97b secured to shaft 96, to bring into engagement or disengagement the gears 94 and 95. When the gears are disengaged by movement of handle 97, the shaft 96 can be positioned at any initial starting adjustment by means of the positioning knob 98 for initiating the washing cycle. When the handle 97 is released, spring 110 returns shaft 96 leftward.

The first manipulation of the knob 98 is such as to set the drive crank 99 a proper angular distance from the driven pin 100. This permits the drive shaft 96 to be rotated a selected period of time before the members 99 and 100 come into driving engagement. The time that shaft 96 rotates before the members 99 and 100 engage each other is the period A during which the tub 18 is filled with soap solution and the period B during which the clothes are agitated in the soap solution. This period B is adjustably selectable to provide a variable wash period, of a length desired by the user, during which the clothes are agitated in the soap solution. After the members 99 and 100 come into engagement, the shaft 96a is rotated, and the remaining washing operations C to I are controlled by the cams 101 to 106 inclusive, which are mounted on shaft 96a, which starts its rotation at the termination of wash period B. The initial tub filling period A, during which the pump withdraws soap solution from reservoir 20 and discharges it into the tub 18 is performed by cam 107, after which the variable soap wash period B is determined by the original setting of the distance between members 99 and 100 which selects the time that shaft 96 can rotate before it starts rotating shaft 96a.

Figure 6:
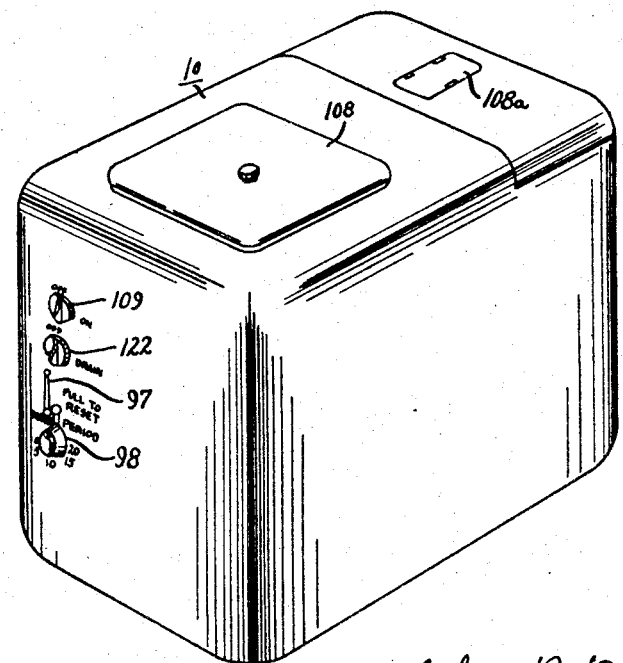
Fig. 6 is a perspective view of the exterior of the washing machine.
Figure 13:
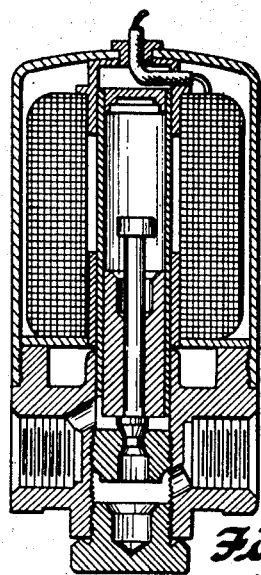
Figs. 13, 14 and 15 are cross-sections of portions of solenoids which may be used in connection with my invention.
Figure 16:
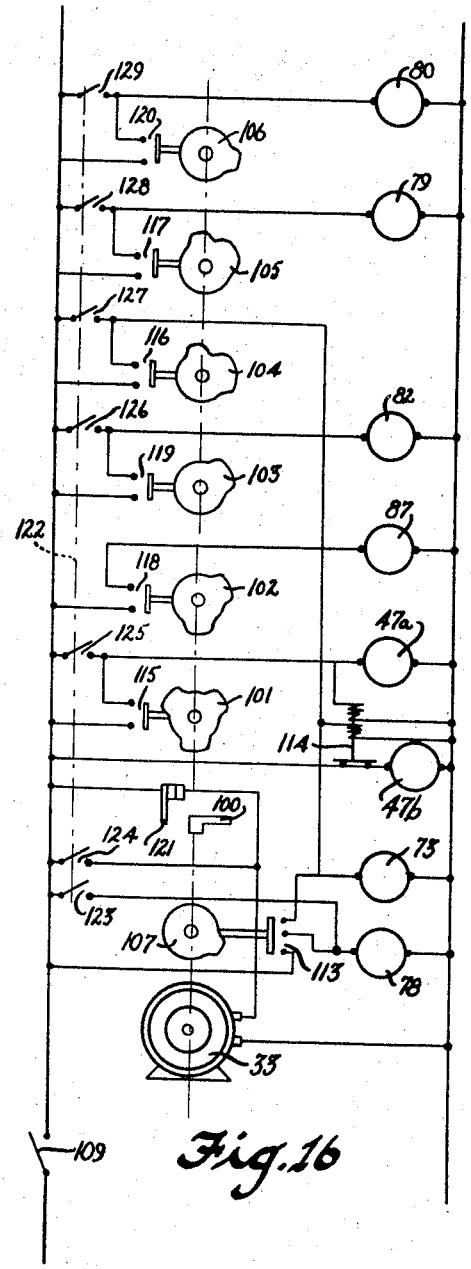
Fig. 16 is a wiring diagram showing the application of the automatic control of the various parts of the washing machine.
Figure 27:
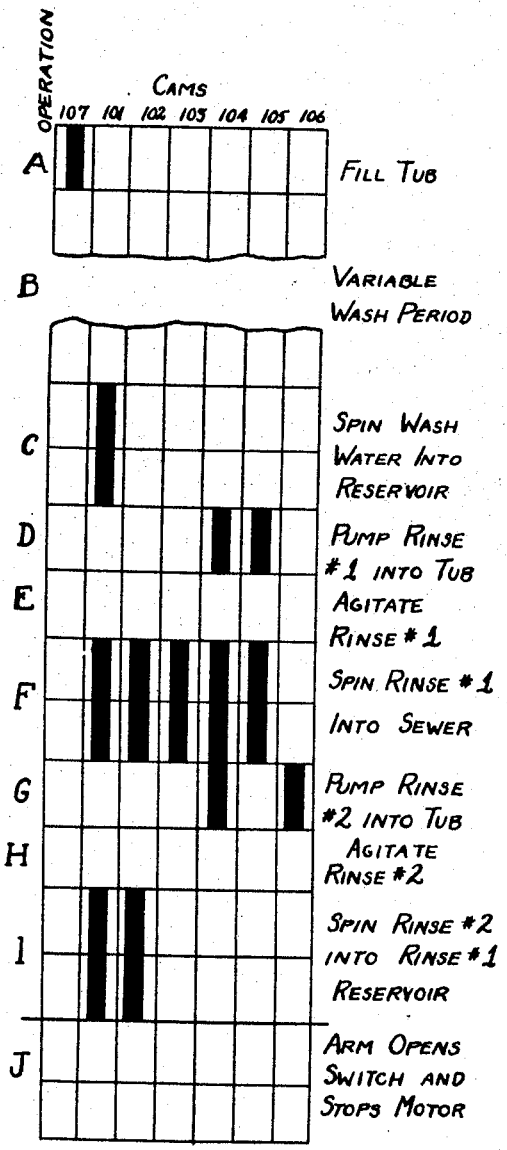

Fig. 16 shows the action of the various cams. After the clothes have been placed in the tub 18, the cover 108 is closed and the soap solution and rinses are placed in reservoirs 20, 21 and 22 through the hinged door opening 108a. The switch 109 is turned to the "on" or closed position. The handle 97 is then moved outwardly to disengage the gears 94 and 95 and the knob 98 is turned to the proper index (see Fig. 6) to provide the desired length of washing period B. The handle 97 is then released, so that the spring 110 moves the shaft 96 to the left and engages the gears 94 and 95. The cam 107 is provided with a following switch 111, carried by a movable arm 112, so that when the shaft 96 is initially positioned at its selected position the contacts 113 of the switch 111 are closed and remain closed a sufficient length of time to pump the soap solution from the reservoir 20 into the tub 18. The closing of contacts 113 energizes the pump clutch solenoid 73 and the soap solution valve 78 to cause the pumping operation. The contacts 113 remain closed a sufficient length of time to permit all of the liquid to be transferred from the reservoir 20 into the tub 18. During the time that the tub is being filled, the tub and agitator are stationary since the solenoids 47a and 47b are not energized. When the circuits to pump clutch solenoid 73 or to spin solenoid 47a are closed the relay switch 114 is opened, thus preventing energization of the agitation solenoid 47b at that time. Accordingly, while liquid is being pumped into tub 18 during operation A, the agitator 19 remains stationary, but as soon as operation B begins, by the opening of contacts 113, relay 114 closes and causes operation of agitator 19 through solenoid 47b. The agitator 19 continues to be reciprocated for the selected wash period of time B, determined by the initial setting, by knob 98, of the angular distance between the members 99 and 100. Contacts 113 open after a fixed period of time A and before the members 99 and 100 come into engagement.

Figure 14:
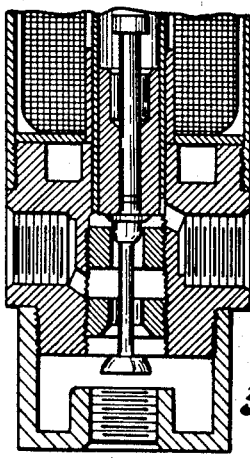

After the members 99 and 100 come into engagement, the shaft 96a begins to rotate and the cam 101 moves to close contacts 115, as indicated by the time sheet, Fig. 17, period C. The closing of the contacts 115 energizes the solenoid 47a and deenergizes solenoid 47b, thus changing the drive from agitation to spinning and causing the clothes to be centrifuged for a suitable period of time C, as long as the corresponding knob of cam 101 keeps the switch 115 closed. The soap solution, during this centrifuging period, is discharged into the trough 85 and from thence flows through the valve 87 and pipe 88 back into the reservoir 20 for reuse with the second batch of clothes. The valve 87 is of the character shown in Fig. 14, and, when unenergized, causes liquid to flow into the pipe 88 rather than into the pipe 89.

The next operation D, the pumping of the first rinse water into tub 18, takes place, as indicated by Fig. 17, when cams 104 and 105 close their respective switches 116 and 117. The closing of switch 116 energizes the pump solenoid 73, which, by the means of cantilever 118, acting against tension spring 118a, engages the pump clutch 71 and drives the pump 70. The closing of switch 116 also energizes and opens relay 114 thus preventing agitation. At the same time, the closing of the switch 117 energizes the solenoid valve 79 of the reservoir 21 and causes the pump 70 to pump the first rinse water from reservoir 21 into tub 18. At this time, the cam 101 has opened the switch 115 and thus the tub is not rotated, and the first rinse water remains in the tub 18. After the filling operation D is terminated by the opening of switch 116 by cam 105, operation E takes place by the consequent deenergization and closing of relay 114. This energizes agitation solenoid 47b and causes agitation of the clothes during period E.

After the clothes have been properly agitated during period E, the cams 101, 102, 103, 104 and 105 close their respective contacts 115, 118, 119, 116 and 117 during period F to cause the first rinse water to be discharged from tub 18 into sewer connection 84. This is accomplished by centrifuging the first rinse into reservoir 21 and pumping it from thence into sewer connection 84. The closing of switch 115 causes the tub to spin by the energization of solenoid 47a, and prevents agitation by the energization and opening of relay 114. The closing of switch 118 energizes solenoid valve 87, so that the rinse water being centrifuged flows through pipe 89 into the reservoir 21. The closing of the contacts 119 energizes the solenoid valve 82, so that the discharge from the pump 70, and from reservoir 21 is directed to the sewer connection 84. The closing of switch 116 energizes the pump clutch and stops the agitator, and the closing of switch 117 energizes valve 79, so that the pump 70 can remove the soiled first rinse water as fast as it is returned to reservoir 21 and can discharge it to the sewer connection 84.

Thereafter operation G takes place during which the second rinse is pumped from reservoir 22 into tub 18. Cam 104 keeps the switch 116 closed, and the cam 106 closes the contacts 120. Since the contacts 116 remain closed, the pump continues to operate and relay 114 remains open to prevent actuation of the agitator, and the closing of contacts 120 energizes the solenoid valve 80 and causes the pump 70 to pump the second rinse water from reservoir 22 into the tub 18. The agitator and tub are stationary during this period.

During period H the clothes are agitated in the second rinse water. During this period all pumping operations are stopped and the agitator is actuated since relay 114 is closed.

Thereafter, during period I, the final centrifugal spinning action takes place and the second rinse water is directed into reservoir 21 for use with the next subsequent batch of clothes because cams 101 and 102 close their respective contacts 115 and 118 to spin the tub and to energize valve 87 and direct the extracted rinse water into reservoir 21.

The continued rotation of the control device brings the arm 100 into engagement with the switch 121 at point 121a (Fig. 12) to open its contacts. The opening of contacts 121 stops the motor 33 and stops all operations, so that the washed and dried clothes can be removed from the tub 18 during the indefinitely long period of time J during which all washing operations are stopped. The next subsequent batch of clothes is inserted in tub 18 during this period J. The reservoir 22 is refilled with rinse water, the control reset, and washing operations are repeated on the next batch of clothes as previously described with respect to the first batch.

When it is desired to empty the machine of all liquids, the drain switch 122 is turned to the drain position. The turning of this switch (indicated by dotted line 122 in Fig. 16) closes contacts 123 to 129 inclusive. The closing of switches 123 and 124 energizes motor 33 and valve 78. The closing of switches 126 to 129 energizes valve 82, pump clutch solenoid 73, and valves 79 and 80 respectively and opens relay 114. The closing of contacts 125 causes the tub to spin. The tub 18, before the switch 122 is manipulated, can be scrubbed with water which remains in the tub until switch 122 is manipulated. As the tub 18 then spins, the water in the tub is centrifugally discharged into reservoir 20 and from thence through pump 70 into the sewer connection 84.

The relative position of these parts can be changed. The reservoirs 20, 21 and 22 need not be placed inside the casing 10, but may be on the outside of the casing and the automatic operation still may be maintained.

Figure 11:
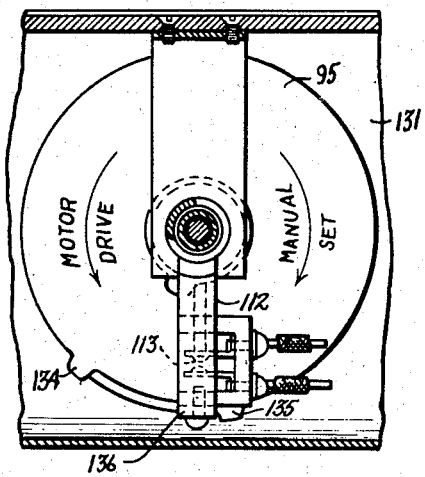
Fig. 11 is a cross-section taken along the line 11—11 of Fig. 8.

Mechanism which causes the switch 111 to follow properly the cam 107 is provided. The arm 112 is frictionally held in any position by hub 130. The hub 130 is pulled against support 131 by spring 132 and sleeve 133, so that arm 112 tends to remain wherever last positioned. The gear wheel 95 has two lugs 134 and 135 which straddle the lower portion 136 of arm 112. When gear wheel 95 is turned (Fig. 11) as indicated by the arrow on the right, lug 135 carries arm 112 with it in a clockwise direction, so that when operation is started and gear wheel 95 is started counter-clockwise by motor operation, cam 107 closes switch 113 for the necessary period of time to pump the soap solution from reservoir 20 to tub 18. The switch 113, and arm 112, remain frictionally in the same place until the knob of cam 107 has passed and opened the switch 113 to terminate the pumping action. Thereafter the lug 134 moves the arm 112 counter-clockwise during the selected length of time of period B after which the shaft 96a starts rotation to control operations C-I inclusive, to be ready to be again set by lug 135 when the machine is reset. During the resetting operation the cam 107 is moved to the right by the movement of handle 97 (Fig. 8) so that the cam 107 does not engage switch 113 during the resetting operation.

Figure 12:
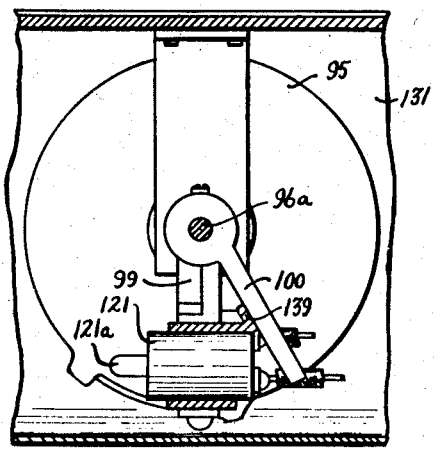
Fig. 12 is a cross-section taken along the line 12—12 of Fig. 8.
Figure 15:
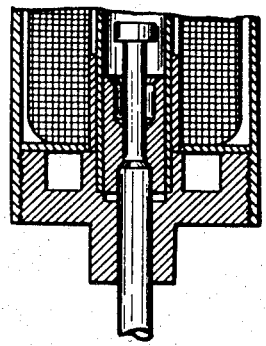

The shaft 96a constantly is under a clockwise (as viewed in Fig. 12) turning impulse under the action of spring 138, so that it moves from the position shown in Fig. 12 only when turned by drive crank 99. When the control mechanism is reset by the user, and when handle 97 is pulled out, the shaft 96a is returned to the Fig. 12 position by spring 138 and is held with pin 100 against stop 139. This returns shaft 96 and knob 98 to "zero" position. The user then turns knob 98 to the desired washing period of 5, 10, 15, 20 or other desired number of minutes.

The moving parts of the driving mechanism are enclosed in casing 150 which swings from rods 14. The casing 150 is partially filled with oil, so that all of the moving parts of the driving mechanism are lubricated by the splash system.

While the form of embodiment of the invention as herein disclosed, constitutes a preferred form, it is to be understood that other forms might be adopted, all coming within the scope of the claims which follow.

What is claimed is as follows:

1. A washing machine including a tub, filling means for filling the tub with liquid, agitating means for agitating the contents of the tub, a manually settable control means for controlling each of said means, said control means including a settable device movable to selective positions for controlling said filling and agitating means to fill the tub and agitate the contents therein, a second device having a lost motion connection with said settable device for controlling said filling and agitating means to provide a rinsing period, and a driving means for driving said settable device.

2. A control including a first set of control devices, a second set of control devices, a settable device movable to selective positions to operate said first set of control devices in a selective period according to its selective setting, a second device for operating said second set of control devices, a driving means for driving said settable device, and a lost motion connection connecting said settable device and said second device for driving the second device after the selective period of the settable device.

3. A control including a first set of control devices, a second set of control devices, a settable device movable to selective positions to operate said first set of control devices in a selective period according to its selective setting, a second device for operating said second set of control devices, a disconnectible driving means disconnectible from said settable device during the setting of said settable device for normally driving said settable device, and a lost motion connection connecting said settable device and said second device for driving the second device after the selective period of the settable device.

4. A control including a first set of control devices, a second set of control devices, a settable device manually movable in one direction to various selective positions and movable in a second direction to operate said first set of control devices, a second device for operating said second set of control devices, a disconnectible driving means disconnectible from said settable device during the setting of said settable device for normally driving said settable device in said second direction, and a lost motion connection connecting said settable device and said second device for driving the second device after the selective period of the settable device.

JOHN B. DYER.

REFERENCES CITED

The following references are of record in the file of this patent:

UNITED STATES PATENTS

| Number | Name | Date |
| --- | --- | --- |
| 1,955,033 | Stone | Apr. 17, 1934 |
| 2,227,077 | Geldhof et al. | Dec. 31, 1940 |
| 2,168,326 | Collins | Aug. 8, 1939 |
| 2,161,604 | Watts | June 6, 1939 |
| 2,267,786 | Chayie | Dec. 30, 1941 |
| 2,225,407 | Bassett | Dec. 17, 1940 |
| 2,030,451 | Kerr | Feb. 11, 1936 |